United States Patent [19]

Kojima et al.

[11] Patent Number: 4,787,610

[45] Date of Patent: Nov. 29, 1988

[54] VIBRATION ISOLATING DEVICES

[75] Inventors: Hiroshi Kojima; Michihiro Orikawa; Takuya Dan, all of Yokohama, Japan

[73] Assignee: Bridgestone Corporation, Tokyo, Japan

[21] Appl. No.: 862,350

[22] PCT Filed: Sep. 5, 1985

[86] PCT No.: PCT/JP85/00498

§ 371 Date: May 2, 1986

§ 102(e) Date: May 2, 1986

[87] PCT Pub. No.: WO86/01567

PCT Pub. Date: Mar. 13, 1986

[30] Foreign Application Priority Data

Sep. 5, 1984 [JP] Japan ................... 59-185789

[51] Int. Cl.$^4$ ............... F16F 9/06; F16F 15/04
[52] U.S. Cl. .................. 267/140.1; 267/35; 267/122; 188/317; 188/320; 248/562; 248/631; 248/632; 248/636
[58] Field of Search ........ 267/140.1, 35, 122, 267/151; 188/320; 248/559, 562, 631, 632, 636

[56] References Cited

U.S. PATENT DOCUMENTS

| 4,277,056 | 7/1981 | Ticks | 267/140.1 |
| 4,422,779 | 12/1983 | Hamaekers et al. | 267/140.1 X |
| 4,572,490 | 2/1986 | Alciati | 267/140.1 |
| 4,595,183 | 6/1986 | Dan et al. | 267/140.1 |
| 4,621,795 | 11/1986 | Eberhard et al. | 248/636 X |
| 4,635,910 | 1/1987 | Ozawa et al. | 267/140.1 |
| 4,638,981 | 1/1987 | Sciortino | 267/140.1 X |
| 4,645,188 | 2/1987 | Jordens | 267/140.1 |
| 4,647,023 | 3/1987 | Ray et al. | 267/140.1 X |
| 4,657,232 | 4/1987 | West | 267/140.1 |
| 4,720,086 | 1/1988 | Le Salver et al. | 267/140.1 |

FOREIGN PATENT DOCUMENTS

| 27751 | 4/1981 | European Pat. Off. | 267/35 |
| 115417 | 8/1984 | European Pat. Off. | 267/140.1 |
| 3142673 | 5/1983 | Fed. Rep. of Germany . | |
| 3421119 | 12/1985 | Fed. Rep. of Germany . | |
| 2500555 | 8/1982 | France | 267/140.1 |
| 138422 | 8/1982 | Japan | 267/140.1 |
| 18633 | 1/1985 | Japan . | |
| 8601567 | 3/1986 | PCT Int'l Appl. | 267/140.1 |

Primary Examiner—Randolph A. Reese
Assistant Examiner—John A. Ricci
Attorney, Agent, or Firm—Sughrue, Mion, Zinn, Macpeak & Seas

[57] ABSTRACT

This invention is a liquid filled type vibration insulating device, wherein a partition member dividing a closed chamber into two liquid chambers is provided with a gas chamber isolated from both liquid chambers and a portion of the gas chamber adjacent to at least one of the liquid chambers is partly or wholly defined by a flexible diaphragm, and is to prevent the increase of dynamic spring rate in the vibration insulating device due to high frequency vibrations by absorption of vibration through deformation of a flexible diaphragm when high frequency, small amplitude vibrations are particularly transmitted to the device.

4 Claims, 4 Drawing Sheets

FIG_3a
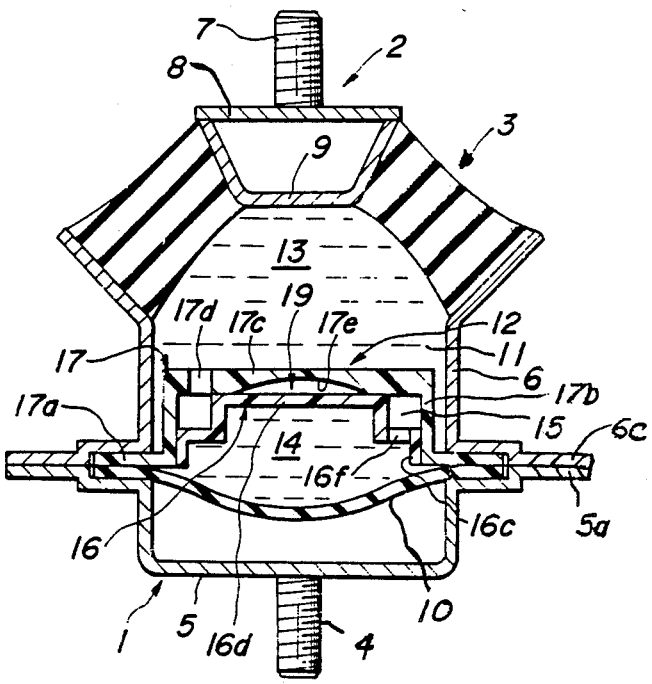
FIG_3b
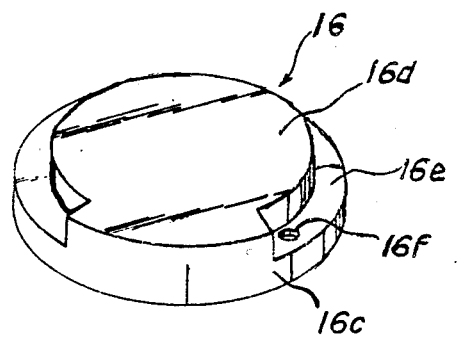

FIG_4
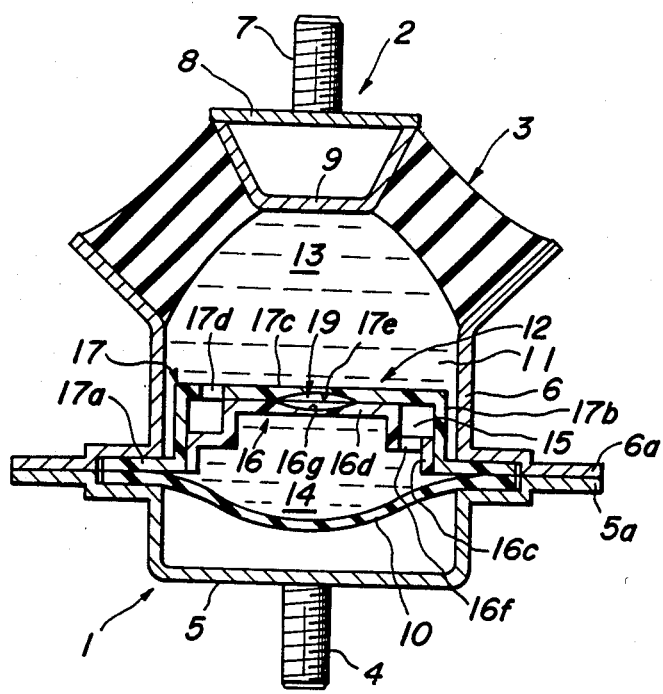

FIG_5a
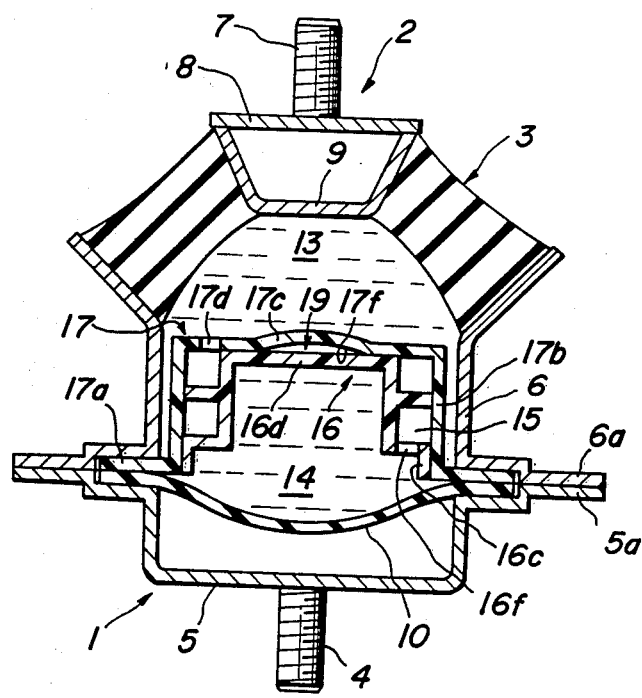
FIG_5b
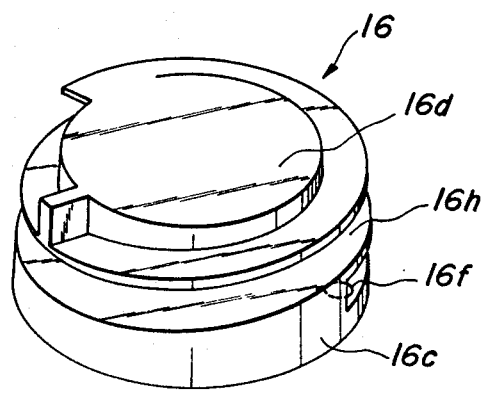

VIBRATION ISOLATING DEVICES

TECHNICAL FIELD

This invention relates to a vibration isolating device suitable for use in an automobile and other vehicles, machinery instruments and the like, which serves to sufficiently damp low frequency, large amplitude vibrations but also to effectively insulate high frequency, small amplitude vibrations.

BACKGROUND ART

The conventional known vibration isolating device widely used, for instance, as an engine mount for automobile vehicles comprises a frame body connected to a vehicle chassis, a frame body connected to an engine, an elastic member disposed between these frame bodies and contributing to the formation of a closed chamber, water or other liquid filled in the closed chamber, a partition member secured at its peripheral edge to one of the above two frame bodies and dividing the closed chamber into two liquid chambers, and a passage arranged in the partition member to communicate the two liquid chambers with each other.

When vibration from the engine is transmitted to the vibration isolating device, it can be damped by a flow resistance subjected to the liquid when the liquid flows from the one liquid chamber to the other through the passage in addition to an internal friction of the elastic member.

In this vibration isolating device, however, when the vibration transmitted to the device is, for example, high frequency, small amplitude vibrations of not less than 50 Hz, the communication passage between both the liquid chambers is rendered into a choked state to raise the dynamic spring rate in the device, whereby the ride comfortability on the vehicle is unfavorably deteriorated.

In order to solve the aforementioned problem, there has been proposed a vibration isolating device in Japanese Patent laid open No. 53-5,376 (Japanese Patent Application No. 52-78,477), wherein an oscillation plate is arranged in the boundary between both the liquid chambers. In this case, if high frequency, low amplitude vibrations are transmitted to the vibration isolating device, the oscillation plate is oscillated in the liquid to absorb such vibrations.

In this device, however, the oscillation plate absorbs the high frequency vibrations because of oscillation in the liquid. The state of no oscillation of the plate results from the friction force between the oscillation plate and the liquid, inertia force of liquid to be removed by the oscillation plate during the oscillation, i.e. rapid increase of dynamic spring rate is unfavorably caused at a relatively low frequency of 150–200 Hz in the high frequency zone.

DISCLOSURE OF INVENTION

Under the above circumstances, the invention is to provide a vibration isolating device capable of effectively developing the conflicting properties between the damping of low frequency, large amplitude vibration and the insulation of high frequency, small amplitude vibration.

According to the invention, there is the provision of a vibration isolating device comprising two frame bodies connecting to separate members, an elastic member closely adhered thereto and contributing to form a closed chamber, water or other liquid filled in the closed chamber, a partition member secured at its peripheral edge to one of the two frame bodies and dividing the closed chamber into two liquid chambers, and at least one restricted passage arranged in the partition member or the other member so as to communicate the two liquid chambers with each other, characterized in that the partition member is provided with a gas chamber isolated from both the liquid chambers, and a portion of the gas chamber adjacent to at least one of the liquid chambers is wholly or partly defined by a flexible diaphragm.

In the vibration isolating device according to the invention, when low frequency, large amplitude vibrations are transmitted to the device, the effective damping of such vibrations is attained mainly by the flow resistance subjected to the liquid flowing from one of the liquid chambers to the other through the restricted passage. On the other hand, when high frequency, small amplitude vibrations are transmitted to the device, the sufficient insulation of such vibrations is attained by the deformation of the flexible diaphragm based on the difference in pressure between the liquid chambers.

Moreover, such a deformation of the flexible diaphragm brings about the expansion and shrinkage deformation of the gas chamber, and hence the friction force between the gas chamber and the liquid in the deformation of the flexible diaphragm and the inertia force of the liquid to be removed in the deformation become very small. Thus, the insulation of high frequency vibrations based on the deformation of the flexible diaphragm is made possible against vibrations of fairly high frequency, for example, 200~250 Hz as compared with the prior art.

BRIEF EXPLANATION OF THE DRAWINGS

FIG. 3(a) and (b) are a longitudinal section view of another embodiment of the device according to the invention and a perspective view of constructional components of the partition member, respectively;

FIG. 4 is a longitudinal section view of the other embodiment of the device according to the invention; and FIGS. 5(a) and (b) are a sectional view of a further embodiment of the device according to the invention and a perspective view of constructional components thereof, respectively.

BEST MODE OF CARRYING OUT THE INVENTION

Figure 1:
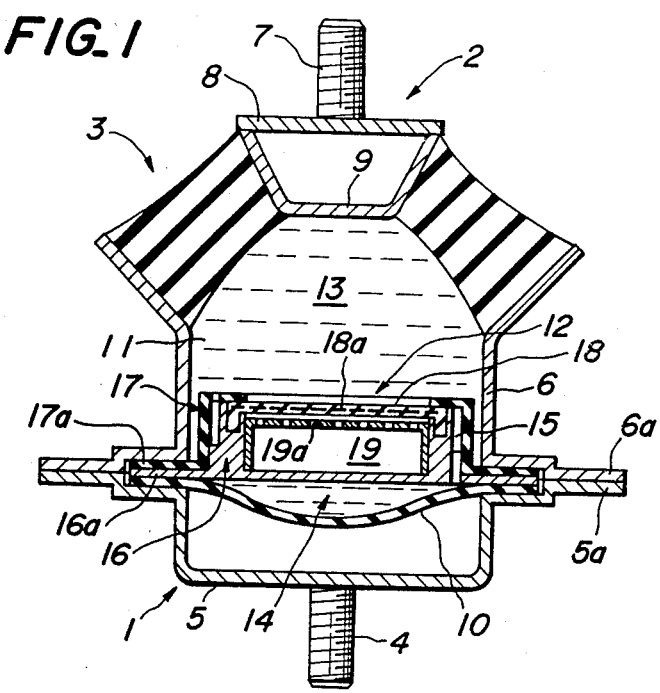
FIG. 1 is a longitudinal section view of a first embodiment of the vibration isolating device according to the invention.

The invention will be explained with reference to the following illustrated examples.

In the figures, numeral 1 is a component, for example, a frame body connected to a vehicle chassis, numeral 2 another component, for example, a frame body connected to an engine, and numeral 3 an elastic member arranged between the frame bodies 1 and 2 and closely adhered thereto and contributing to the formation of a closed chamber as mentioned later.

The frame body 1 is composed by fixing a lower end flange 6a of a cylindrical member 6 to a flange 5a of a dish-like member 5 provided at its lower surface with a fitting bolt 4 protruding downward from the central portion thereof. On the other hand, the frame body 2 is composed by securing a cup-like member 9 to a lower surface of a flat plate 8 provided at its upper surface with a fitting bolt 7 protruding upward from the central portion thereof.

Furthermore, the elastic member 3 may be made of rubber or rubbery elastomeric material, and has a hollow and substantially frustoconical shape. The elastic member 3 is closely adhered to the frame bodies 1, 2 by bonding the lower surface to the upper end enlarged portion 6b of the cylindrical member 6 and the upper surface to the peripheral face of the cup-like member 9 through vulcanization or other process, respectively.

The elastic member 3 contributes to the formation of a closed chamber together with the cylindrical member 6 of the frame body 1, the cup-like member 9 of the frame body 2 and a diaphragm 10 clamped at its peripheral portion between the dish-like member 5 and the cylindrical member 6 in the frame body 1. In this illustrated embodiment, water or other liquid is filled in the entirety of the closed chamber 11 defined by these members.

Also, the closed chamber 11 filled with the liquid is divided into two liquid chambers 13, 14 by a partition member 12 liquid-tightly clamped at its peripheral portion between the dish-like member 5 and the cylindrical member 6. These liquid chambers 13, 14 communicate with each other through a restricted passage 15 formed in the partition member 12 and opening to the chambers.

Moreover, the restricted passage opening to the liquid chambers 13, 14 may be arranged inside or outside the closed chamber 11 independently of the partition member 12.

The partition member 12 comprises a lower partition 16 of a synthetic resin or a metal having an upward recess in its central portion with an upper partition 17 of a synthetic resin or a metal having a substantially hat-like shape, liquid-tightly clamping flanges 16a, 17a of the partitions 16, 17 between the dish-like member 5 and the cylindrical member 6. The restricted passage 15 opens to the liquid chambers 13, 14 between the outer peripheral surface of the lower partition 16 and the inner peripheral surface of the upper partition 17, and closing the upper recess of the lower partition 16 with an elastic diaphragm 18 as a flexible diaphragm to form an air chamber 19 as a gas chamber. In this case, the elastic diaphragm 18 is embedded at its peripheral portion in the lower partition 16 downward and sandwiched between both the partitions 16 and 17 to strongly secure thereto. Furthermore, the elastic diaphragm 18 is adjoined to the upper liquid chamber 13 through an opening formed in the upper partition 17.

In the partition member 12, it is preferable to effectively prevent the deformation of the elastic diaphragm 18 in a direction bulging toward the liquid chamber 13 and a direction opposite thereto in the transmission of large amplitude vibrations by embedding a reinforcing layer 18a in the elastic diaphragm 18 and arranging a deformation-restricting plate 19a having plural holes in the interior of the air chamber 19.

In the illustrated embodiment, the restricted passage 15 having an arc shape in transverse section is opened to each of the liquid chambers 13, 14 at positions opposite to each other in radial direction. Of course, these opening positions may be optionally selected in accordance with the required extending length of the restricted passage 15.

In case of using the vibration isolating device of the above construction as an engine mount, the frame body 1 and the frame body 2 are connected to the vehicle chassis and the engine through the fitting bolts 4 and 7, respectively.

In this case, vibrations transmitted from an engine (not shown) to the frame body 2 are somewhat damped by the internal friction of the elastic member 3. Particularly, when the vibration is low frequency, large amplitude vibration, the liquid filled in the liquid chambers 13, 14 flows from one of the liquid chambers to the other liquid chamber through the restricted passage 15 based on alternate increase and decrease of internal pressures in the liquid chambers. Therefore, the motion energy of the liquid is absorbed by the restricted passage 15, whereby the effective damping of low frequency, large amplitude vibration is attained.

Moreover, when liquid flows between both the liquid chambers, the liquid flowing from the liquid chamber 13 to the liquid chamber 14 brings about the increase in the volume of the liquid chamber 14 corresponding to only the decreased amount of the liquid chamber 13 based on the elastic deformation of the diaphragm 10. For instance, when a through-hole is formed in the dish-like member 5 to communicate the inside and outside thereof with each other, back pressure acting to the diaphragm 10 reduces, resulting in more smooth flowing of the liquid. In such a flow of liquid, it is a matter of course that the elastic diaphragm 18 is deformed up to its limit position in a direction toward the liquid chamber 13 or a direction opposite thereto.

On the other hand, when vibrations transmitted from the engine to the frame body 2 are high frequency, small amplitude vibrations, the restricted passage 15 is choked, while the elastic diaphragm 18 contributing to the formation of the air chamber 19 deforms in either direction in response to the pressure change inside the liquid chamber 13, so that the relative vibration of the frame body 2 to the frame body 1 is sufficiently allowed without increasing and decreasing the internal pressure of the liquid chamber 13. In this way, therefore, the sufficient insulation of high frequency vibrations to the vehicle chassis is attained without raising dynamic spring rate of the vibration insulating device.

Moreover, the deformation of the elastic diaphragm 18 expands and shrinks the air chamber 19, so that the influence of inertia force of liquid to be removed and friction force to the liquid during the deformation can substantially be eliminated, and consequently the vibration frequency causing no deformation of the elastic diaphragm 18 can considerably be raised as compared with techniques conventional. In other words, even if the diameter of the deformable portion of the elastic diaphragm 18 in this embodiment is equal to the diameter of the vibration plate disclosed in Japanese Patent laid open No. 53-5,376, the elastic diaphragm 18 can develop fairly excellent vibration absorbing function against the rising of the vibration frequency.

Figure 2A:
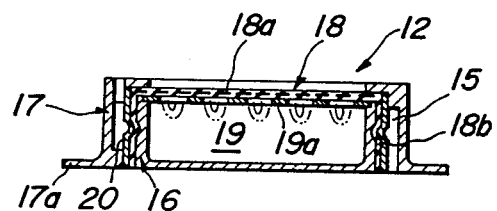
FIG. 2(a)–(c) are sectional views of various modified embodiments of the partition member, respectively.

FIG. 2 a–c are longitudinal section views of other embodiments of the partition member. The partition member 12 shown in FIG. 2(a) is comprised by closing an opening portion of a lower partition 16 composed of a cylindrical member having a bottom wall with an elastic diaphragm 18 and airtightly securing a cylindrically shaped portion 18b of the elastic diaphragm 18 to the periphery of the lower partition 16 through a caulking ring 20 to form an air chamber 19, fixing the same hat-like upper partition 17 as in FIG. 1 to the outside of the air chamber 19 to form a restricted passage 15 opening to each of the liquid chambers 13, 14 between the upper partition 17 and the caulking ring 20.

The partition member 12 may be attached to the frame body 1 through a flange 17a of the upper partition 17. Moreover, when the elastic diaphragm 18 deforms in a direction reducing the air chamber 19, it locally protrudes toward the inside of the air chamber 19 through holes of a deformation-restricting plate 19a arranged inside the air chamber 19 and contacting with the inner surface of the elastic diaphragm 18 as exaggeratingly shown by a phantom line in this figure.

Figure 2B:
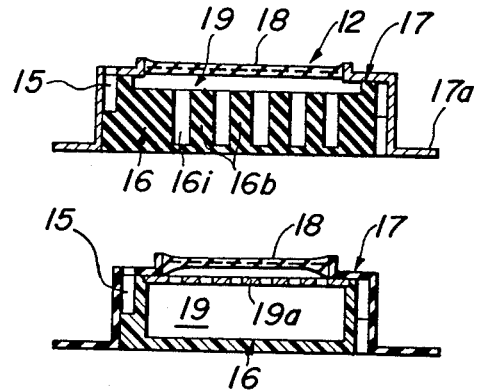
Figure 2C:
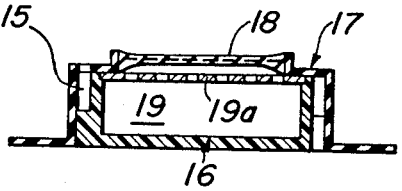

The partition member 12 shown in FIG. 2(b) comprises disposing plural deformation-restricting protrusions 16b upward from a bottom wall in a central recess 16i of a lower partition 16 to make into a comb-like sectional shape, securing a hat-like upper partition 17 to the outside of the lower partition 16, and bonding a periphery of an elastic diaphragm 18 to a central opening formed in the upper partition 17 through vulcanization or the like to form an air chamber 19 and a restricted passage 15. On the other hand, the partition member 12 shown in FIG. 2(c) is composed by securing an upper partition 17 having substantially the same structure as shown in FIG. 2(b) to outsides of a lower partition 16 and a deformationrestricting plate 19a having substantially the same structure as shown in FIG. 2(a), and bonding an elastic diaphragm 18 to the upper partition 17 in the same manner as described on FIG. 2(b) to form an air chamber 19 and a restricted passage 15.

The partitions 12 shown in FIG. 2 can develop the same function as in the partition member 12 of FIG. 1 to attain the effective damping of low frequency, large amplitude vibrations and the sufficient insulation of high frequency, small amplitude vibrations.

FIG. 3 shows another embodiment according to the invention. In this embodiment, a partition member 12 fixed together with a diaphragm 10 between a dish-like member 5 and a cylindrical member 6 in a frame body 1 is constructed with a lower partition 16 made of a reinforced plastic plate and an upper partition 17 secured to the outside of the lower partition 16 and made of an elastomeric plastic plate.

In this case, the upper partition 17 having a substantially hat-like shape has a cylindrical part 17b at its central portion, and a top plate 17c is arranged on the top of the cylindrical part 17b. The lower portion 16 is secured to the top plate 17c. As shown in FIG. 3(b), the lower partition 16 is provided at its outer periphery with a cylindrical part 16c which is secured to the inner periphery of the cylindrical part 17c. In the joint portion between the top plate 16d and the cylindrical part 16c in the lower partition 16 is formed a groove 16e having a substantially L-shaped section perpendicular to the circumferential direction, which forms a restricted passage 15 together with the upper partition 17. The restricted passage 15 is C-shape in transverse section, one end in longitudinal direction communicating with the liquid chamber 13 through a circle hole 17d formed in the top plate 17c of the upper partition 17 and the other end being communicated to the liquid chamber 14 through a circle hole 16f formed in a part of the groove 16e.

The top plate 17c of the upper partition 17 has a substantially spheroidal dent 17e at its lower surface to gradually reduce the thickness toward axial center which forms an air chamber 19 together with the top plate 16d of the lower partition 16.

In this illustrated embodiment, since the upper partition 17 is made of an elastomeric plastic plate and the lower partition 16 is made of the reinforced plastic plate, as the internal pressure of the air chamber 19 increases, the top plate 17c can be deformed in a direction of reducing the air chamber 19.

Therefore, when vibrations transmitted from the engine to the vibration insulating device are, for example, relatively low frequency of less than 50 Hz, the liquid chamber 13 receiving the vibration from the engine shrinks to flow the liquid into the liquid chamber 14 through the restricted passage 15. As a result, the low frequency vibrations are absorbed by resistance force produced in the restricted passage 15.

On the other hand, when the vibrations from the engine are high frequency, the restricted passage 15 is rendered into a choked state. Therefore, as the pressure inside the liquid chamber 13 rises, dynamic spring rate increases, and the vibrations are directly transmitted from the engine to the vehicle chassis. In this embodiment, however, since the air chamber 19 is existent, the top plate 17c can deform to expand or shrink the air chamber 19, so that the volume of the liquid chamber 13 can be changed to control the rising of the pressure, whereby high frequency vibration is absorbed.

Particularly, when the upper partition 17 and lower partition 16 are integrally united with each other as in this embodiment, the space inside the liquid chamber can be utilized effectively, so that the effective vibration absorption can be attained by making a ratio of maximum diameter of the air chamber 19 to inner diameter of the liquid chamber (opening ratio) large.

FIG. 4 shows a further embodiment of the vibration insulating device according to the invention. In this embodiment, a dent 16g is formed in the top plate 16d of the lower partition 16 in addition to the aforementioned dent 17e of the top plate 17c. The air chamber 19 is defined between the dents 16g and 17e.

In an embodiment shown in FIG. 5, an air chamber 19 is defined by protruding a central portion of a top plate 17c with a constant thickness upward to form a dent 17f at the inner face.

Furthermore, in this embodiment, a spiral groove 16h is formed on the periphery of a lower partition 16 as shown in FIG. 5(b), whereby a spirally long restricted passage 15 can be formed together with the inner periphery of a cylindrical part 17b.

INDUSTRIAL APPLICABILITY

As mentioned above, the vibration insulating device according to the invention can attain not only sufficient damping of low frequency, large amplitude vibrations but also effective insulation of high frequency, small amplitude vibrations over a fairly high frequency zone when being applied to automobile and other vehicles, machinery instruments and the like.

We claim:

1. A vibration isolating device comprising: two frame bodies connecting to separate members, an elastic member arranged between said two frame bodies and contributing to form a closed chamber, a liquid filling the closed chamber, a partition member secured at a peripheral edge thereof to one of the two frame bodies and dividing the closed chamber into two liquid chambers, and a passage extending circumferentially in the peripheral portion of the partition member to establish fluid communication to both of the liquid chamber, said partition member comprising two partition plates, at least one of which being made from an elastomeric material, and said partition member provided at the peripheral portion between the two plates with said passage and at the central portion with gas chamber isolated from the liquid chambers.

2. The vibration isolating device according to claim 1, wherein said partition member comprises a partition plate made from a synthetic resin and a partition plate made from a metal.

3. The vibration isolating device according to claim 1, wherein said partition member comprises an elastomeric plastic plate and a reinforced plastic plate.

4. The vibration isolating device according to claim 1, wherein said passage is a spirally extending long passage.

* * * * *